United States Patent Office 3,347,513
Patented Oct. 17, 1967

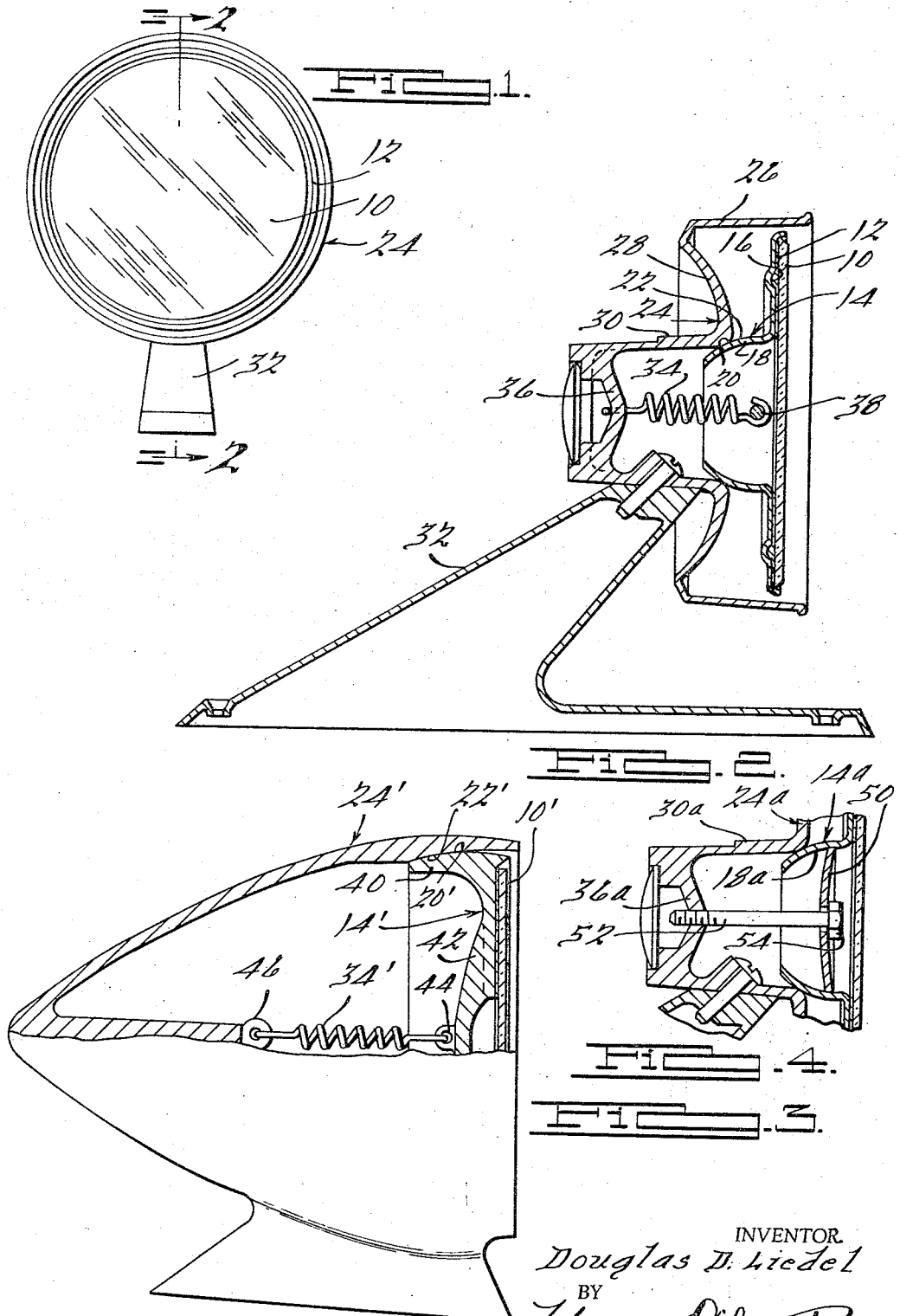

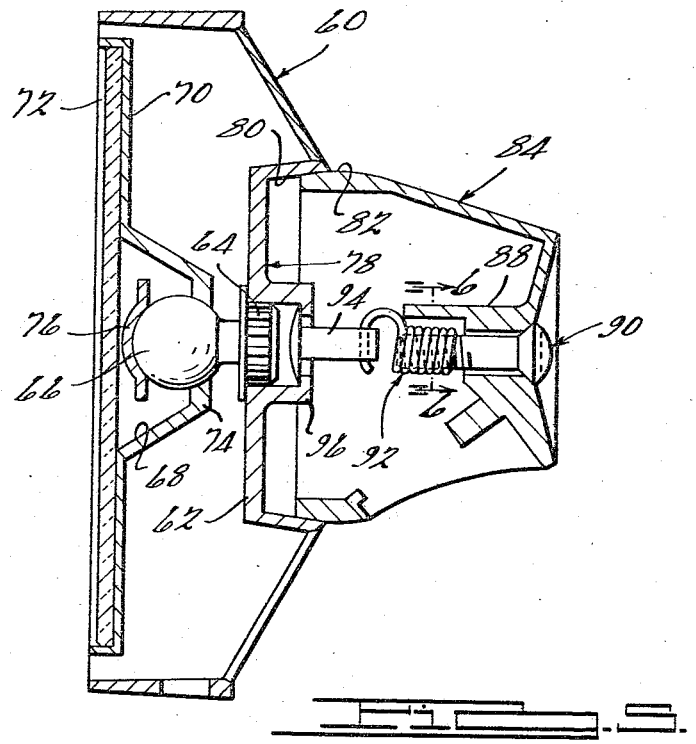
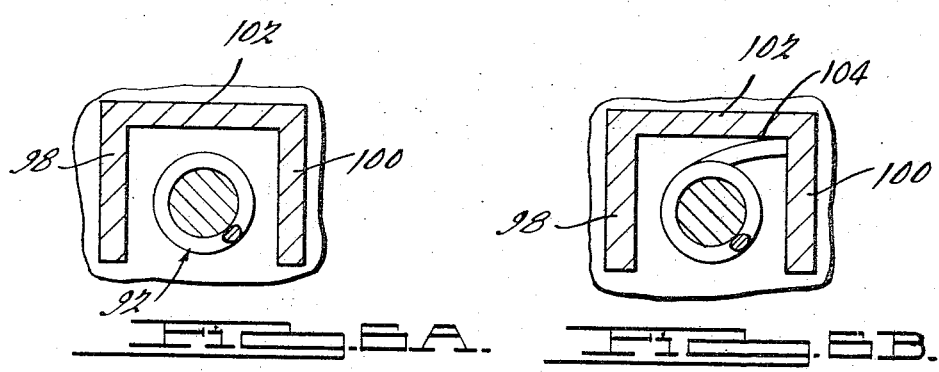

3,347,513
PIVOTABLE MIRROR
Douglas D. Liedel, Belleville, Mich., assignor to C. M. Hall Lamp Company, Detroit, Mich., a corporation of Michigan
Filed Oct. 23, 1965, Ser. No. 517,496
15 Claims. (Cl. 248—483)

ABSTRACT OF THE DISCLOSURE

This application discloses several embodiments of rear view mirrors wherein the mirror element is supported for pivotal movement with respect to a supporting structure. In each embodiment, the supporting structure defines a socket that pivotally supports a ball section of the mirror element. Each embodiment also incorporates a spring for maintaining the ball and socket elements in frictional engagement, which spring acts through a point coincident with the point about which pivotal movement occurs.

---

This application is a continuation-in-part of my application Ser. No. 386,251, filed July 30, 1964, now abandoned.

This invention relates to mirrors and more particularly to mirrors which may be pivotally adjusted in position under manual control.

The principles of the invention are illustratively embodied in an automotive outside mirror suitable for mounting on the exterior of an automobile with the mirror element thereof being positionable by the operator. In the illustrative arrangements, the operator adjusts the position of the mirror element by exerting forces directly upon that element with his hand. Certain of the principles are adaptable to remote-control mirror arrangements in which the adjusting force applied by the operator is exerted through force-transmitting means such as cables or the like.

An object of this invention is to simplify the construction of pivotable mirrors.

Another object of this invention is to improve the pivotal connection between a mirror element and a supporting structure.

A further object of this invention is to form a ball and socket pivotal connection between a stationary member and a mirror-support member by forming integral cooperating curved surfaces on those members.

Another object of this invention is to force the two elements of a ball and socket joint in a pivotal mirror assembly towards one another by means of a spring operating in tension.

A further object of this invention is to establish a forceful engagement between the two elements of a ball and socket joint in a pivotable mirror assembly by the use of a tension spring which acts purely axially and is subject to a constant deflection at all positions of adjustment of the mirror over a range of such positions.

The manner of accomplishing the foregoing objects, and other objects and features of the invention, will become apparent from the following detailed description of illustrative embodiments of the invention when read with reference to the accompanying drawings, in which:

FIGURE 1 is an elevational view of a mirror assembly embodying certain of the principles of the present invention;

FIG. 2 is a sectional view taken substantially along the line 2—2 of FIG. 1;

FIG. 3 is a sectional view of a modified form of the mirror of FIGS. 1 and 2;

FIG. 4 is a fragmentary view of another modification;

FIG. 5 is a sectional view of a modified form of the invention;

FIG. 6A is a sectional view taken substantially along the line 6—6 of FIG. 5; and FIG. 6B is a sectional view taken substantially along the line 6—6 of FIG. 5 and showing an alternative arrangement.

In the structures illustrated in FIGS. 1 and 2, a mirror element 10, which is reflective, or the front or rear surface of which is coated with a reflective material, is glued or otherwise secured to a generally annular mirror support portion 12 of a relatively movable member or body 14. Portion 12 is or may be provided with a circumferential groove 16 in its front face as an adhesive pocket.

Relatively movable member 14 is further provided with a rearwardly projecting portion 18, the external surface 20 of which is curved in a generally spherical form. Convex surface 20 serves as the ball element of a ball and socket joint. It will be observed that the curved surface 20 constitutes but a portion of a complete sphere, the extent of that portion being determined by the extent to which it is desired to tilt the mirror element 10.

Convex surface 20 engages and cooperates with a conforming, concave, generally spherical surface 22 formed on and as an integral part of a relatively stationary member 24. Again, concave surface 22 constitutes but a small portion of a complete sphere. While both surfaces 20 and 22 are illustrated to be spherical, that is, circular in cross section, it will be appreciated that if it is desired to provide less than universal tilting movement of mirror element 10, these surfaces may be formed to permit tilting motion only in such sense or senses as is desired.

Relatively stationary member 24 comprises a tubular outer cover or hood portion 26 extending generally axially of the mirror assembly, a generally annular portion 28 which extends generally radially of the assembly from the cover portion 26 and terminates in a central aperture, and a rearwardly projecting generally tubular portion 30. In the illustrated and preferred arrangement, portions 26, 28 and 30 are integrally formed, and may be a single die casting, and the curved surface 22 is formed at the junction of portions 28 and 30 and is disposed adjacent the aperture in portion 28. Cover portion 26 is larger than and surrounds mirror element 10, whereas the ball and socket joint defined by curved surfaces 20 and 22 is substantially smaller than mirror element 10. Member 24 may be supported in position in any suitable fashion, such as by separate arm 32 to which it is secured.

The elements including curved surfaces 20 and 22 constituting a pivotal ball and socket joint are forced into intimate engagement with one another with sufficient force to tend to frictionally retain the mirror element 10 in the selected tilted relationship with respect to the relatively stationary member 24. The forceful engagement between members 14 and 24 is accomplished by means of a coil spring 34 operating in tension between members 14 and 24. In the illustrated arrangement, one end of tension spring 34 is anchored or connected to a cross web 36 formed integrally with and at the end of portion 30 of relatively stationary member 24, and the other end of tension spring 34 is connected to a cross web or rod 38 formed in or secured to the relatively movable member 14. In the preferred arrangement, the rod or web 38 is positioned such that the end of spring 34 is connected to member 14 at the point about which rotation occurs, that is, about the center of the spherical surface 20. To this end, the rod 38 is, in the illustrated arrangement, disposed along a diameter of that spherical surface and the end of spring 34 is connected to the midpoint of that rod. If desired, the rod may be notched or otherwise deformed at its center point to position the end of spring 34. It will further be observed that in the illustrated arrangement, the anchored end of spring 34 is secured to the web 36 at a point such that the force exerted by spring 34 is exerted axially of the mirror assembly.

By securing the tension spring to the pivotal center of the ball, tension spring 34 acts purely axially and is subject to a constant deflection and hence exerts a constant force at all positions of adjustment of the mirror element 10 throughout the range of adjustments of that element. Consequently, spring 34 does not exert any force tending to shift the adjusted position of mirror element 10 from its selected position towards a neutral position.

In the arrangement of FIG. 2, the ball and socket joint is formed by surfaces integral with the relatively stationary and relatively movable members and is smaller in size than the mirror element 10. In the alternative construction illustrated in FIG. 3, the ball and socket joint is similarly formed by integrally curved surfaces 20′ and 22′ on the relatively movable and relatively stationary members 14′ and 24′, respectively, but in this case, those surfaces are larger in size than the mirror element 10′. In the arrangement of FIG. 3, the relatively movable member 14′ includes an outer generally tubular portion 40, the outer periphery of which constitutes the integral convex curved surface 20′, supported by a generally radially disposed web or plate portion 42 formed and disposed so as to support a spring anchor 44 at or substantially at the center of the spherical surface 20′. Surface 20′ cooperates with the concave curved surface on the inside of the forward cover or hood portion of the relatively stationary member 24′. Coil spring 34′ operates in tension between spring anchor 44 and a spring anchor 46 formed integrally with or secured to the relatively stationary member 24′. Again, the spring 34′ preferably acts axially and at a fixed deflection at all adjustments of the mirror element 10′ over the range of available adjustments. The range of adjustment may be controlled by disposing appropriate stop members is fixed relation to the relatively stationary member 24′ and adapted to engage portions of the relatively movable member 14′ at selected rotational positions thereof.

The modification illustrated in FIG. 4 is as the unit of FIG. 2 except that it illustrates a different form of spring means. In FIG. 4, a spring washer (as, a "Belleville" washer) is seated within the open end of portion 18a, with its peripheral edge engaging and remaining effectively stationary with respect to portion 18. It may bow either outwardly or inwardly. A tension rod such as a screw 52 is threaded into an aperature in the web 36a and projects through a central aperture in washer 50, and its head 54 rests on the forward face of that washer.

Whether the washer 50 is bowed forwardly or rearwardly, the system including washer 50 and rod 52 acts as a tension spring in that it exerts a resilient force tending to move portion 18a toward web 36a, with rod 52 acting in tension. For the reasons previously discussed, the tension spring means preferably acts effectively at the pivotal center of portion 18a, as by placing the head of the screw, or the area of the engagement between the head of the screw and the washer 50 at or substantially at the pivotal center of the portion 18a.

In the arrangement illustrated in FIG. 4, a clearance is illustrated between the central aperture and the spring washer and the tension rod and it is contemplated that the washer will remain fixed with respect to the ball and tilt about the tension rod. However, the washer may be arranged to tilt relative to the ball, if desired.

The method of assembling the illustrated mirror assemblies above described will be apparent from the foregoing, except to note that in the illustrated constructions the glass is glued in place after the spring it attached. Other constructions may be employed if desired.

In each of the above illustrated arrangements, the mirror element is immovably fixed with respect to the movable member. This is not essential to the practice of the principles of the invention, as is illustrated, in the arrangement of FIG. 5. In that arrangement, the relatively movable member or body 60, in the form of a shroud, includes a centrally apertured backplate 62 which drivedly accepts the knurled end portion 64 of a ball stud 66, with ball stud 66 being fixed against movement with respect to head 60. The head of ball stud 66 is majorially disposed within a cavity 68 defined by portions of a mirror supported structure 70 which carries the mirror or reflective element 72. The rear face of cavity 68 is defined by plate portion 74, integral with support structure 70 and centrally apertured to accept a reduced diameter portion of the head of ball stud 66. A strip spring 76 is secured to the mirror support structure 70 at one or both ends and resiliently bears against the forward end of the head of ball stud 66 to seat it in the aperture and plate portion 74, in the well-known manner. Thus, the reflective element 72 may be manually tilted (desirable universally) with respect to the head or shroud 66, if desired. Alternatively, the relationship between the position of the reflective element 72 and the head 60 may be remotely controlled through the use of cables or otherwise, if desired.

In either case, the mirror itself is normally fixed with respect to the head or shroud 60 in the sense that movements of the head or shroud 60 will cause correlative movement of the mirror 72, that is, movement of the head 60 will not cause mirror 72 to move relative to the head 60.

Head 60 is provided, at its rear exterior face, with a recess 78 defined in part by an inwardly facing surface 80. Surface 80 is movably engageable with an outwardly facing peripheral surface 82 on a cap member 84. Cap member 84, which may be secured or adjustably secured to a base or pedestal which may in turn be secured to an automobile or the like, serves as a relatively stationary member. Cap 84, which is generally cup-shaped, is provided with a forwardly projecting centrally disposed internal boss 88 which is centrally apertured to freely accept a screw 90. Screw 90 threadedly engages at least the rearmost turns of a coil spring 92, the foremost end of which engages a slot near the end of a headed rivet 94. The shank of rivet 94 passes through an aperture in the rear face of a centrally disposed rearwardly projecting boss 96 formed on the backplate 62 and the head of that rivet engages portions of that boss so that rearwardly exerted forces may be applied to boss 96 via rivet 94. In the illustrated arrangement, the hollow boss 96 accommodates both the head of rivet 94 and the knurled portion 64 of the ball stud 66 and, in assembly, the rivet is first inserted and then the knurled portion 64 is pressed into place.

Spring 92 acts as a resilient member acting in tension correlatively to the arrangements above described, to exert a force tending to move head 60 rearwardly into engagement with cap 84, desirably with substantial force so as to insure adequate frictional engagement between surfaces 80 and 82 to preserve the manually selected adjustment. Boss 88 is preferably provided with a forwardly extending three-faced cavity defined by a pair of side walls 98 and 100 and up upper wall 102 (FIG. 6A), accommodating at least a portion of spring 92. If desired, the rearmost turn of spring 92 may continue in the helical path of the spring as is illustrated in FIG. 6A. In that event, with rivet 94 being free to rotate, under applied torque, relative to boss 96, the unit, once assembled, cannot be feasibly disassembled with the mirror assembly mounted on an automobile since counter-clockwise rotation or screw 90 will merely produce corresponding rotation of both spring 92 and rivet 94, and will produce no relative rotational or unscrewing movement between screw 90 and spring 92. If it is desired to disassemble the unit, means may be provided (such as a squared shank) for preventing relative rotation between rivet 94 and boss 96 or the rearmost end of spring 92 may be extended as at 104 to engage a wall or walls of the forwardly projecting portion of boss 88 as is illustrated in FIG. 6B. The extended portion 104 of the spring will thereby serve as a torque arm to prevent spring 92 from rotating with spring 90 to prevent ready disassembly of the unit, if desired.

The surfaces 80 and 82 are rotatable with respect to one another. This relative movement may be in the form only of relative rotational movement of head 60 and cap 84 about the longitudinal axis through ball stud 66 and screw 90 (in the illustrated arrangement). In that case, curved surfaces 80 and 82 may be conical, or cylindrical, spherical or otherwise as long as they are curved in the sense of permitting the observed rotational motion and maintaining the axial and radial relation of the elements during that rotation. The relative movement is preferably, however, universal, within amplitude limits, that is, head 60 can preferably be manually rotated relative to cap 84 in any sense, about a point (or substantially so). In the illustrated arrangement, the latter is the case and the point lies on the longitudinal axis of rivet 94 and is between the head of that rivet and the aperture which accepts the end of spring 92.

To accommodate universal movement, both surfaces 80 and 82 may be spherical, if desired, or one or both may be otherwise curved. In the illustrated arrangement, a curved surface 82 is a spherical surface and curved surface 80 is a conical surface. It will be recognized that it is not critical that both surfaces be continuous. They should, however, cooperate to permit the desired universal movement. One of the two surfaces is deemed concave, in that reference is made to an inwardly-opening surface, and the other convex, an outwardly facing surface, whether they are conical, spherical, or otherwise.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A pivotable mirror assembly comprising a relatively stationary member, a relatively movable member for supporting a mirror, cooperating ball and socket elements on respective of said members for supporting said relatively movable member for pivotal movement relative to said relatively stationary member about a point at the rotational center of said ball and socket elements, a tension spring, means securing one portion of said tension spring to said relatively stationary member, and means securing another portion of said tension spring to said relatively movable member substantially at said point.

2. The combination of claim 1 in which said socket element is on said relatively stationary member and in which said ball element is on said relatively movable member.

3. The combination of claim 1 in which said relatively stationary member has an integral curved surface formed thereon constituting one of said elements.

4. The combination of claim 1 in which said relatively stationary member has an integral curved surface formed thereon constituting said socket element and in which said ball element is on said relatively movable member.

5. The combination of claim 1 in which said relatively movable member includes a mirror-support portion for holding the mirror and an integral curved portion constituting one of said elements.

6. The combination of claim 5 in which said integral curved portion has a convex surface and constitutes said ball element.

7. The combination of claim 1 in which said relatively stationary member has an integral concavely curved surface formed thereon constituting said socket element and in which said relatively movable member includes a mirror-support portion for holding the mirror and an integral convexly curved portion constituting said ball element.

8. A pivotable mirror assembly comprising a relatively stationary member having an integral curved surface formed thereon, a relatively movable member having a mirror-support portion for holding a mirror and having an integral curved surface formed thereon cooperable with said integral curved surface on said relatively stationary member and forming therewith a rotatable connection between said relatively movable member and said relatively stationary member, and means for resiliently forcing said curved surfaces towards one another and into forceful cooperating engagement with one another, said integral curved surface on said relatively stationary member including a concave portion constituting a socket element of a ball and socket pivotal connection and said integral curved surface of said relatively movable member including a convex portion constituting the ball element of said ball and socket pivotal connection, said relatively stationary member including a cover portion greater in size than the mirror, said integral curved surface on said relatively stationary member being generally circular in cross section and being smaller in size than said cover portion and the mirror, said convex portion projecting from said mirror-support portion and being generally circular in cross section and smaller in size than the mirror and than said mirror-support portion.

9. A pivotable mirror assembly comprising a relatively stationary member having an integral curved surface formed thereon, a relatively movable member having a mirror-support portion for holding a mirror and having an integral curved surface formed thereon cooperable with said integral curved surface on said relatively stationary member and forming therewith a rotatable connection between said relatively movable member and said relatively stationary member, and means for resiliently forcing said curved surfaces towards one another and into forceful cooperating engagement with one another, said integral curved surface on said relatively stationary member including a concave portion constituting a socket element of a ball and socket pivotal connection and said integral curved surface of said relatively movable member including a convex portion constituting the ball element of said ball and socket pivotal connection, said relatively stationary member including a cover portion greater in size than the mirror, said integral curved surface on said relatively stationary member being generally circular in cross section and being larger in size than the mirror, and said cover portion projecting beyond said mirror-support portion and being generally circular in cross section and larger in size than the mirror and than said mirror-support portion.

10. A pivotable mirror assembly comprising a relatively stationary member having an integral curved surface formed thereon, a relatively movable member having a mirror-support portion for holding a mirror and having an integral curved surface formed thereon cooperable with said integral curved surface on said relatively stationary member and forming therewith a rotatable connection between said relatively movable member and said relatively stationary member, and means for resiliently forcing said curved surfaces towards one another and into forceful cooperating engagement with one another, said integral curved surface on said relatively stationary member including a concave portion constituting a socket element of a ball and socket pivotal connection and said integral curved surface of said relatively movable member including a convex portion constituting the ball element of said ball and socket pivotal connection, said relatively stationary member including a first centrally apertured portion and a second generally tubular portion integral with said first portion and aligned with the aperture therein, and said integral curved surface of said relatively stationary member being adjacent the aperture in said first portion and at the junction of said first and second portions.

11. A pivotable mirror asembly comprising a relatively stationary member having an integral curved surface formed thereon, a relatively movable member having a mirror-support portion for holding a mirror and having an integral curved surface formed thereon cooperable with said integral curved surface on said relatively stationary member and forming therewith a rotatable connection between said relatively movable member and said relatively stationary member, and means for resiliently forcing said curved surfaces towards one another and into forceful cooperating engagement with one another, said means including a screw connected to said relatively stationary member, and in which said resilient forcing means is a spring threadedly engaging said screw.

12. The combination of claim 11 further including means for preventing relative rotation between said spring and said relatively stationary member.

13. A pivotable mirror assembly comprising a relatively stationary hollow mirror head open at one end and having an integral concave spherical surface portion on the inner surface thereof adjacent said one end, a relatively movable mirror-support member for supporting the mirror having an integral convex spherical surface portion cooperable with and conforming to said integral curved surface on said head and forming therewith a ball and socket pivotal connection between said movable mirror-support member and said head, and means for retaining said curved surfaces in cooperating engagement.

14. A pivotable mirror assembly comprising a relatively stationary hollow mirror head open at one end and having an integral concave spherical surface portion on the inner surface thereof adjacent said one end, a relatively movable mirror-support member for supporting the mirror having an integral convex spherical surface portion cooperable with and conforming to said integral curved surface on said head and forming therewith a ball and socket pivotal connection between said movable mirror-suppport member and said head, and means for resiliently forcing said curved surfaces towards one another and into forceful cooperating engagement.

15. A pivotable mirror assembly comprising a relatively stationary member, a relatively movable member for supporting a mirror, and means for supporting said relatively movable member upon said relatively stationary member for limited universal movement with respect thereto about a point and including spring means operating in tension and having one portion secured to said relatively stationary member and another portion secured to said relatively movable member substantially at said point, said spring means comprising a spring washer having a peripheral portion fixed with respect to one of said members, the means securing said one portion to said relatively stationary member comprising a tension rod engaging said washer at a central portion thereof and having an end portion secured to the other one of said members.

References Cited

UNITED STATES PATENTS

| | | | |
|---|---|---|---|
| 1,523,399 | 1/1925 | Chamberlin | 317—236 |
| 1,558,641 | 10/1925 | Short | 248—483 |
| 1,749,868 | 3/1930 | Anderson | 248—483 |
| 1,796,093 | 3/1931 | Florman | 248—483 |
| 2,533,475 | 12/1950 | Koonter | 248—478 |
| 2,534,495 | 12/1950 | Younghusband | 248—483 |
| 2,567,169 | 9/1951 | Green et al. | 287—12 |
| 2,921,807 | 1/1960 | McRae | 287—12 |
| 3,214,578 | 10/1965 | Talbot | 240—4.2 |

ROY D. FRAZIER, *Primary Examiner.*

JOHN PETO, *Examiner.*

W. D. LOULAN, *Assistant Examiner.*